(12) United States Patent
Taylor

(10) Patent No.: US 11,421,964 B1
(45) Date of Patent: Aug. 23, 2022

(54) BALLISTICS RESISTANT HARD PLATE ARMOR

(71) Applicant: East West Consolidated, LLC, Apex, NC (US)

(72) Inventor: Joseph F. Taylor, Apex, NC (US)

(73) Assignee: East West Consolidated, LLC, Apex, NC (US)

( * ) Notice: Subject to any disclaimer, the term of this patent is extended or adjusted under 35 U.S.C. 154(b) by 0 days.

(21) Appl. No.: 17/027,819

(22) Filed: Sep. 22, 2020

Related U.S. Application Data

(62) Division of application No. 16/423,506, filed on May 28, 2019, now Pat. No. 10,794,665.

(60) Provisional application No. 62/676,335, filed on May 25, 2018.

(51) Int. Cl.
*F41H 5/04* (2006.01)
*B32B 5/24* (2006.01)
*B32B 37/12* (2006.01)
*B32B 18/00* (2006.01)

(52) U.S. Cl.
CPC ......... *F41H 5/0435* (2013.01); *F41H 5/0471* (2013.01); *F41H 5/0492* (2013.01); *B32B 5/24* (2013.01); *B32B 18/00* (2013.01); *B32B 37/12* (2013.01); *B32B 2250/03* (2013.01); *B32B 2250/40* (2013.01); *B32B 2305/80* (2013.01); *B32B 2307/558* (2013.01); *B32B 2323/043* (2013.01); *B32B 2571/02* (2013.01)

(58) Field of Classification Search
CPC ..................................................... F41H 5/0435
See application file for complete search history.

(56) References Cited

U.S. PATENT DOCUMENTS

| | | | |
|---|---|---|---|
| 5,437,905 A * | 8/1995 | Park | B32B 5/12 428/105 |
| 9,726,459 B2 | 8/2017 | Waldrop | |
| 2005/0153098 A1* | 7/2005 | Bhatnagar | B32B 5/12 428/113 |

OTHER PUBLICATIONS

What are Unidirectional Carbon Fiber Fabrics (https://www.fibreglast.com/product/What-are-Unidirectional-Carbon-Fiber-Fabrics/Learning_Center) (Year: NA).*

* cited by examiner

*Primary Examiner* — Reginald S Tillman, Jr.
(74) *Attorney, Agent, or Firm* — NK Patent Law

(57) ABSTRACT

Described herein are hard armor plate comprising a first molded plate of a plurality of ballistic fibers, a second molded plate of a plurality of ballistic fibers, and a layer of ceramic tiles adhered to the first molded plate and the second molded plate, wherein the layer of ceramic tiles is between the first molded plate and the second molded plate; and methods of making hard armor plates.

8 Claims, 5 Drawing Sheets

BALLISTICS RESISTANT HARD PLATE ARMOR

CROSS-REFERENCE TO RELATED APPLICATION

This application is a divisional of U.S. patent application Ser. No. 16/423,506, titled "Ballistics Resistant Hard Plate Armor", filed May 28, 2019, which claims the benefit of priority of U.S. Provisional Patent Application No. 62/676,335, titled "Ballistics Resistant Armor" filed on May 25, 2018 which are incorporated herein in their entity by this reference.

FIELD

The present disclosure relates to the field of ballistics resistant hard plate armor.

BACKGROUND

Body armor has traditionally been produced using metals and alloys, and more recently has utilized high performance materials and ceramic synthetic materials. There remains a need for improved ballistics resistant hard plate armor.

In particular, there remains a need for improved ballistics resistant hard plate armor that utilizes ceramic, which is one the hardest and most lightweight materials, without the typical problems associated with ceramics in hard plate armor. Ceramics are problematic due to cracking and being defective after a single hit by a bullet. Ceramic plates made of mosaic tiles are also problematic due to weaker protective capability at the joints and the inability to provide comprehensive protection.

SUMMARY OF THE DISCLOSURE

A first aspect of the invention includes a hard armor plate comprising a first molded plate of a plurality of ballistic fibers, a second molded plate of a plurality of ballistic fibers, and a layer of ceramic tiles adhered to the first molded plate and the second molded plate, wherein the layer of ceramic tiles is between the first molded plate and the second molded plate. In an embodiment, the plurality of ballistic fibers of the first molded plate are a plurality of aramid layers, a plurality of ultra-high molecular weight polyethylene layers, or a combination of a plurality of aramid layers and ultra-high molecular weight polyethylene layers. In another embodiment, the plurality of ballistic fibers of the first molded plate are a plurality of layers of uni-directional aramid with lamination 20 gsm per square meter. In another embodiment, the plurality of ballistic fibers of the first molded plate are 20-40, 20-25, 25-30, 30-35, or 35-40 layers of uni-directional aramid.

In another embodiment, the plurality of ballistic fibers of the second molded plate are a plurality of aramid layers, a plurality of ultra-high molecular weight polyethylene layers, or a combination of a plurality of aramid layers and ultra-high molecular weight polyethylene layers. In another embodiment, the plurality of ballistic fibers of the second molded plate are a plurality of layers of ultra-high molecular weight polyethylene with lamination 100 gsm per square meter. In another embodiment, the plurality of ballistic fibers of the second molded plate are a molded plate of 80-130, 80-90, 90-100, 100-110, or 120-130 layers of ultra-high molecular weight polyethylene.

In another embodiment, the ceramic tiles are hexagon-shaped, silicone carbide ceramic tiles. In another embodiment, the ceramic tiles are 5.8 mm thick and 30 cm×30 cm. In another embodiment, the ceramic tiles are pressure sintered ceramic tiles.

A second aspect of the invention includes a method of making a method of making a hard armor plate comprising forming a first molded plate of a plurality of ballistic fibers, forming a second molded plate of a plurality of ballistic fibers, adhering a layer of ceramic tiles to the second molded plate of a plurality of ballistic fibers, and adhering the first molded plate of a plurality of ballistic fibers to the layer of ceramic tiles. In an exemplary embodiment, the step of forming a first molded plate of a plurality of ballistic fibers comprises a heating and cooling step. In an exemplary embodiment, the heating step comprises heating a plurality of unidirectional aramid layers at a temperature in the range of 150-200 degrees Celsius, applying pressure in the range of 4-10 MPa for 2-5 minutes, applying pressure in the range of 6 and 15 MPa for 10-20 minutes, applying pressure in the range of 15 and 25 MPa for 15-30 minutes, and forming a molded plate. In an exemplary embodiment, the cooling step comprises applying coolant to the molded plate and applying pressure in the range of 15 and 20 MPa until the mold has a temperature in the range of 45-55 degrees Celsius. In another embodiment, the step of forming a first molded plate of a plurality of ballistic fibers further comprises cooling the molded plate for an additional 24 hours or more in ambient room temperatures. In another embodiment, the step of forming a first molded plate of a plurality of ballistic fibers further comprises cutting the molded plate to a shape with a computer numerical control (CNC) saw, bandsaw, or other shape processing methods known in the art.

In another embodiment, the step of forming a second molded plate of a plurality of ballistic fibers comprises a heating and cooling step. In an exemplary embodiment, the heating step comprises heating a plurality of ultra-high molecular weight polyethylene layers at a temperature in the range of 120-150 degrees Celsius, applying pressure in the range of 4-10 MPa for 3-4 minutes, applying pressure in the range of 6-15 MPa for 10-20 minutes, applying pressure in the range of 12 and 25 MPa for 20-40 minutes, and forming a molded plate. In another embodiment, the cooling step comprises introducing a coolant to the molded plate and applying a pressure in the range of 12-25 MPa until the molded plate has a temperature in the range of 50 Celsius. In another embodiment, the step of forming a second molded plate of a plurality of ballistic fibers further comprises cooling the molded plate for an additional 24 hours or more in ambient room temperatures. In another embodiment, the step of forming a second molded plate of a plurality of ballistic fibers further comprises cutting the molded plate to a shape with a computer numerical control (CNC) saw, bandsaw, or other shape processing methods known in the art.

DETAILED DESCRIPTION

Body armor has recently utilized high performance materials and ceramic synthetic materials. Ceramics, for example, are some of the hardest materials with the additional advantage of being lightweight. Ceramics are usually used as ceramic plates inserted in soft ballistic vests. Ceramic plates are problematic due to cracking and being defective after a single hit by a bullet. Ceramic plates made of mosaic tiles are also problematic due to weaker protective capability at the joints and the inability to provide comprehensive protection. Alternative configurations, such as vests comprising overlapping circular ceramic discs encased in a fiber glass textile or a ballistic fabric cover has also been problematic due to controversially inconsistent ballistic armor testing results.

Advantageously, it has surprisingly been found that, the hard armor plates disclosed herein solves problems associated with use of ceramics in armor. The hard armor plates disclosed here can sustain multiple shots (such as a combination of 6 shots from any one of or combination of: 5.56 M855 (green tip) 62 grain ammunition at 3000 fps, 5.56 M855A1 (62 grain) ammunition at 3000 fps, and XM193 (55 grain) ammunition in excess of 3400 fps). The hard armor plates disclosed herein also deter all spalling caused by the strike of projectiles and capture shrapnel inside the plate enclosure, thus eliminating the trauma caused by the fracturing of projectiles at impact with the hard armor plate. Ballistic resistance testing shows the hard armor plates disclosed herein stopped new military grade 5.56 M855A1 and M193 at velocities over 3000 ft/s without shrapnel, without penetration, and only minor deformation. The hard armor plates disclosed herein pass all NIT requirements for Handguns (Level II and IIIA); stab and blunt trauma requirements; and Level III Requirements for 7.62x51 Nato (0.308 Win) M80 Ball, 5.56 M855 (green tip) 62 grain at 3000 fps, 5.56 M855A1 (62 grain) at 3000 fps, and XM193 (55 grain) in excess of 3400 fps.

While hybrid body armor plates having existed with ceramic backed by compressed ballistic material, the hard armor plates disclosed herein are distinguishable by adding a molded plate of a plurality of ballistic fibers in front of the traditional ceramic strike face. The strike face is traditionally used to arrest or shatter the ammunition on impact, while the backing traditionally is used to support the strike-face material and protect against damaged projectile. The hard armor plates disclosed herein, which have a layer of ceramic tiles between two molded plates, are unconventional and an unexpected structural design because ceramic is one of the hardest materials and favored over most materials as the strike face.

Figure 1:
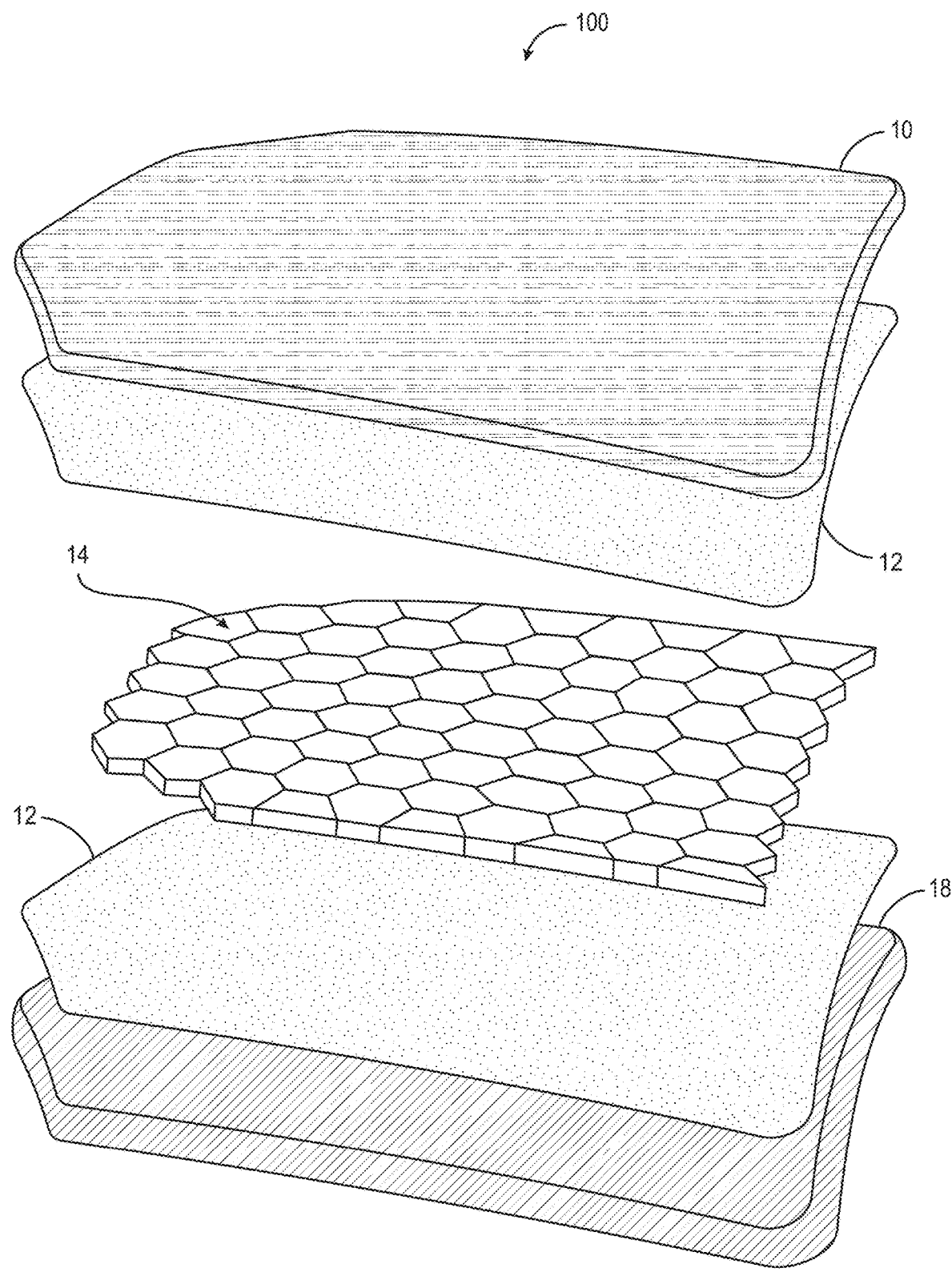
FIG. 1 is an exploded view of an embodiment of a hard armor plate.

FIG. 1 is an exploded view of an embodiment of a hard armor plate 100. FIG. 1. illustrates a first molded plate of a plurality of ballistic fibers 10, a layer of ceramic tiles 14, and second molded plate of a plurality of ballistic fibers 18, wherein the layer of ceramic tiles 14 is adhered to the first molded plate of a plurality of ballistic fibers 10 and the second molded plate of a plurality of ballistic fibers 18 with adhesives 12 and is between the first molded plate 10 and the second molded plate 18. The hard armor plate may be flat, single curved, or multi-curved. The hard armor plate may have a SAPI, swimmer or shooter, or square cut. In an embodiment, the plurality of ballistic fibers of the first molded plate are a plurality of aramid layers, a plurality of ultra-high molecular weight polyethylene layers, or a combination of a plurality of aramid layers and ultra-high molecular weight polyethylene layers. In another embodiment, the plurality of ballistic fibers of the first molded plate are a plurality of layers of uni-directional aramid with lamination 20 gsm per square meter. In another embodiment, the plurality of ballistic fibers of the first molded plate are 20-40, 20-25, 25-30, 30-35, or 35-40 layers of uni-directional aramid.

Aramid is a class of heat-resistant and strong synthetic fibers. They are fibers in which the chain molecules are highly oriented along the fiber axis, so the strength of the chemical bond can be exploited. Aramid fibers have good resistance to abrasion, good resistance to organic solvents, nonconductive, no melting point, degradation starts from 500° C., low flammability, good fabric integrity at elevated temperatures, sensitive to acids and salts, sensitive to ultraviolet radiation and prone to electrostatic charge build-up unless finished. Examples of aramid fibers include para-aramids, Kevlar™, Technora®, Twaron®, Heracron®, Nomex®, Innegra S®, and Vectran®.

In another embodiment, the plurality of ballistic fibers of the second molded plate are a plurality of aramid layers, a plurality of ultra-high molecular weight polyethylene layers, or a combination of a plurality of aramid layers and ultra-high molecular weight polyethylene layers. In another embodiment, the plurality of ballistic fibers of the second molded plate are a plurality of layers of ultra-high molecular weight polyethylene with lamination 100 gsm per square meter. In another embodiment, the plurality of ballistic fibers of the second molded plate are a molded plate of 80-130, 80-90, 90-100, 100-110, or 120-130 layers of ultra-high molecular weight polyethylene.

UHMWPE is a subset of the thermoplastic polyethylene. Also known as high-modulus polyethylene, (HMPE), or high-performance polyethylene (HPPE), it has extremely long chains, with a molecular mass usually between 2 and 6 million units. The longer chain serves to transfer load more effectively to the polymer backbone by strengthening intermolecular interactions. This results in a very tough material, with the highest impact strength of any thermoplastic presently made. Examples of UHMWPE include but are not limited to, Dyneema® and Spectra®.

The first molded plate of a plurality of ballistic fibers and the second molded plate of a plurality of ballistic fibers can be produced by the methods described herein, platen hydraulic press, and by other methods known in the art such as by utilization of a vacuum table.

In another embodiment, the ceramic tiles are hexagon-shaped, silicone carbide ceramic tiles. In another embodiment, the ceramic tiles are 5.8 mm thick and 30 cm×30 cm. In another embodiment, the ceramic tiles are pressure sintered ceramic tiles. Examples of ceramic materials include, but are not limited to, aluminas, boron carbide, aluminum oxide, Barium titanate, strontium titanate, Bismuth strontium calcium copper oxide, Boron nitride, Earthenware, Ferrite, Lead zirconate titanate (PZT), Magnesium diboride (MgB2), Porcelain, Sialon (Silicon Aluminium Oxynitride), Silicon carbide (SiC), Silicon nitride (Si3N4), Steatite (magnesium silicates), Titanium carbide, Uranium oxide (UO2), Yttrium barium copper oxide (YBa2Cu3O7-x), Zinc oxide (ZnO), Zirconium dioxide (zirconia), titanium boride, aluminum nitride, and synthetic diamond composite (e.g. Syndite), partially stabilized zirconia (PSZ), and combinations thereof. Exemplary ceramic materials include ceramics processed by sintering, reaction bonding, or hot pressing. Commercially available ceramic armor materials includes Hexoloy® Sintered, Saphikon® Sapphire, and Norbide® Hot Pressed.

Ceramic material is often described in terms of hardness using the Mohs scale. The Mohs scale of mineral hardness is a qualitative ordinal scale that characterizes the scratch resistance of various minerals through the ability of a harder material to scratch a softer material. The Mohs scale of mineral hardness is based on the ability of one natural sample of mineral to scratch another mineral visibly. In various embodiments, the ceramic material has a Mohs hardness scale range from about 4.5 to 6.5, for example 4.5, 4.6, 4.7, 4.8, 4.9, 5.0, 5.1, 5.2, 5.3, 5.4, 5.5, 5.6, 5.7, 5.8, 5.9, 6.0, 6.1, 6.2, 6.3, 6.4, or 6.5.

As shown in FIG. 1, the layer of ceramic tiles 14 is adhered to the first molded plate of a plurality of ballistic fibers 10 and the second molded plate of a plurality of ballistic fibers 18 with adhesives 12. The adhesive between the layer of ceramic tiles 14 and the first molded plate of a plurality of ballistic fibers 10 and the adhesive between the layer of ceramic tiles 14 and the second molded plate of a plurality of ballistic fibers 18 can be the same (as shown) or different. Examples of adhesives include high performance contact adhesive, epoxy phenolic resin, vinyl ester resin, ultraviolet curing resins, thermoplastic resin, thermoset resin, polyethylene, ionomer resin, polypropylene, carbon fiber reinforced polyphenylene sulfide anti-ballistic resin, polyurea, polyurethane, or combinations thereof.

Figure 2:
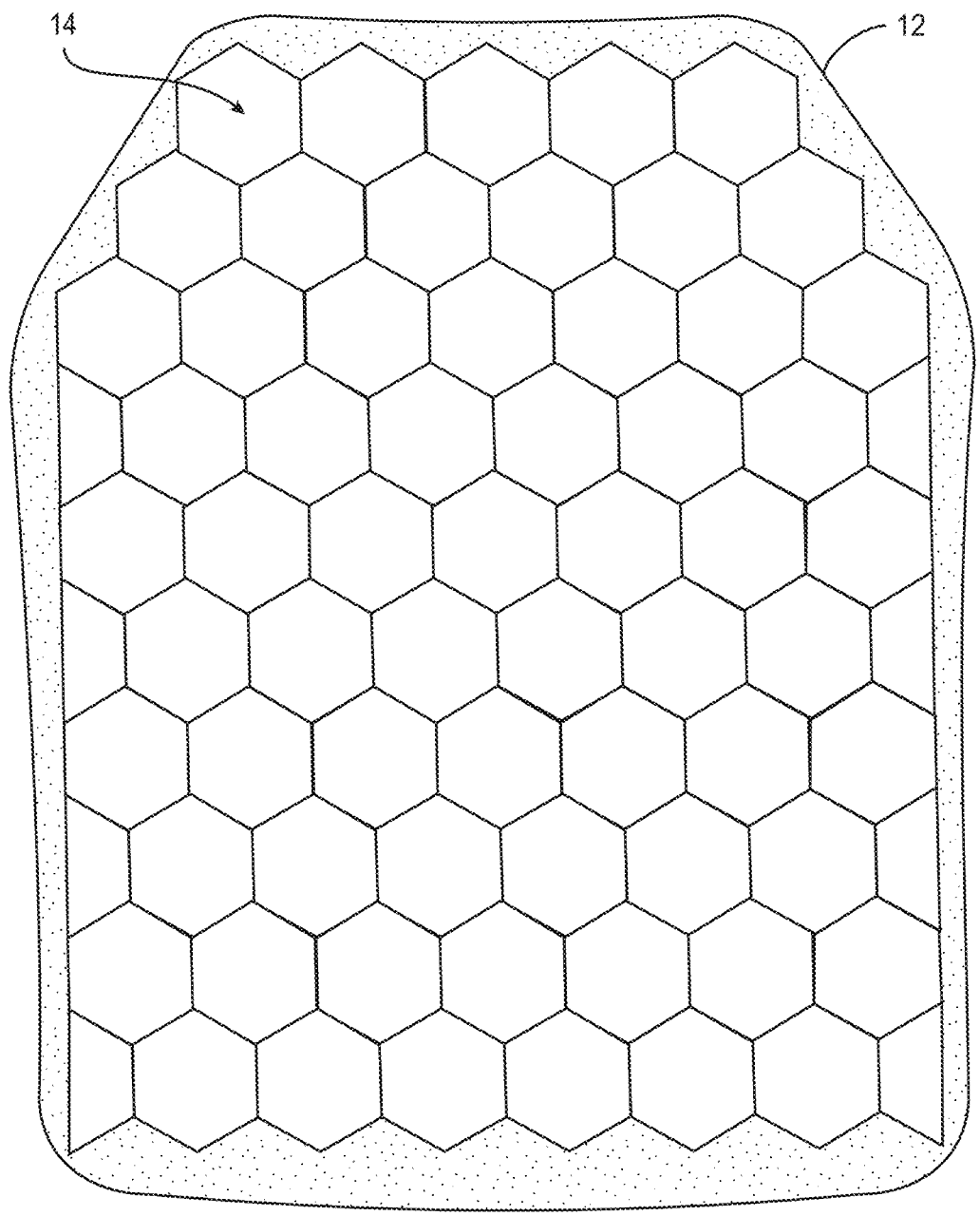
FIG. 2 is a cross-section view of an embodiment of a hard armor plate depicting a straight-on view of a layer of ceramic tiles of the hard armor plate.

FIG. 2 is a cross-section view of an embodiment of a hard armor plate depicting a straight-on view of a layer of ceramic tiles of the hard armor plate. As shown in the FIG. 1 and FIG. 2 embodiments, the adhesives 12 cover the surfaces of the first molded plate and the second molded plate, and thus is representative of the size and shape of the first molded plate and the second molded plate in FIG. 2. As shown in FIG. 1 and FIG. 2, the layer of ceramic tiles 14 is smaller in size, e.g. narrower in width and height, than the first molded plate 10 and the second molded plate 14. In other embodiments, the adhesives 12 do not necessarily have the shape of the first molded plate or the second molded plate, and one skilled in the art would appreciate appropriate variations in adhesive products and applications.

Figure 3A:
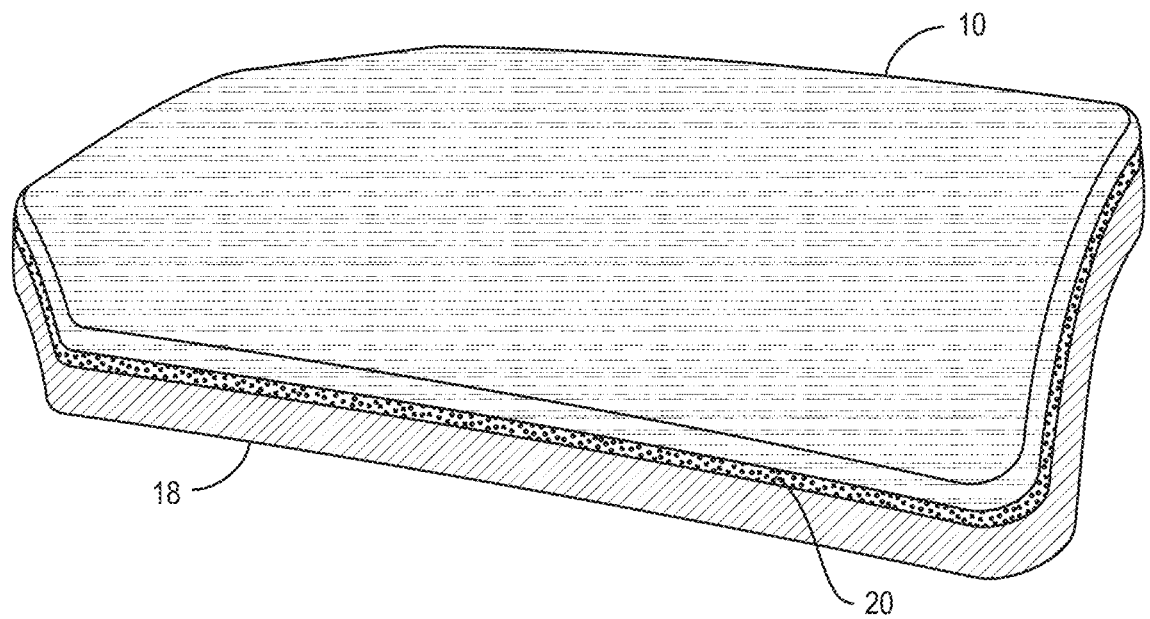
FIGS. 3A, 3B, and 3C are perspective views of an embodiment of a hard armor plate comprising additional adhesives.
Figure 3B:
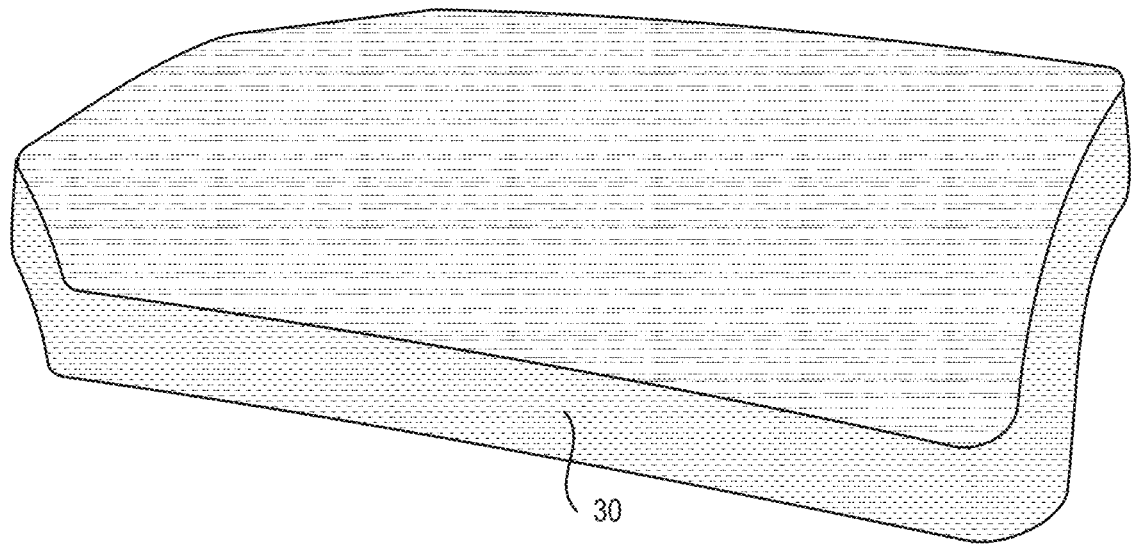
Figure 3C:
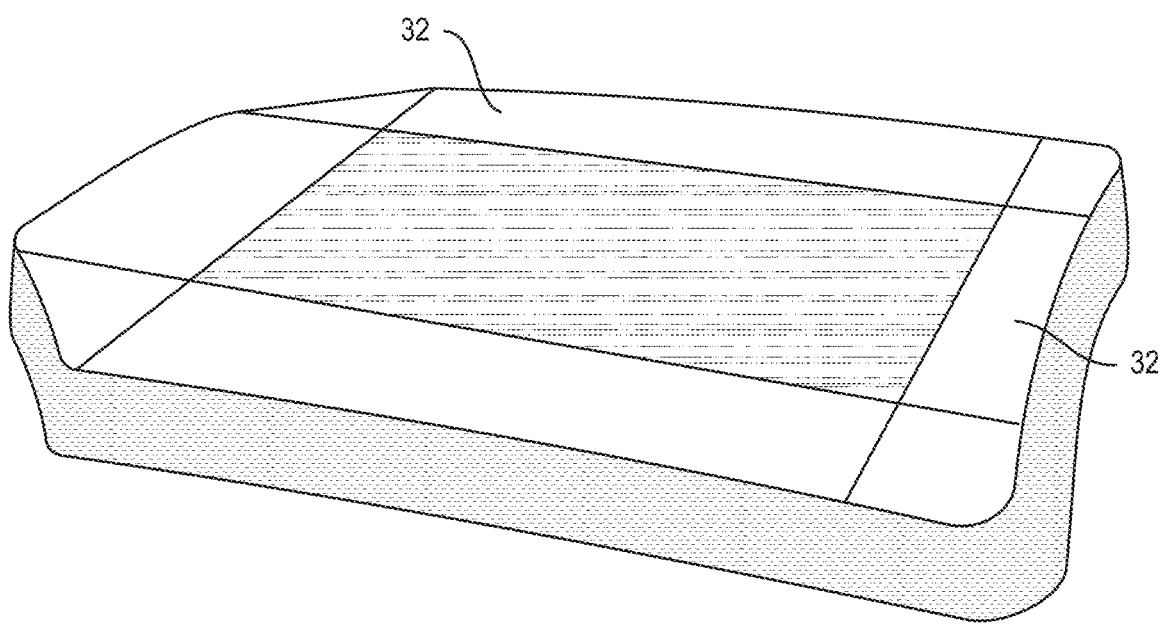
Figure 4A:
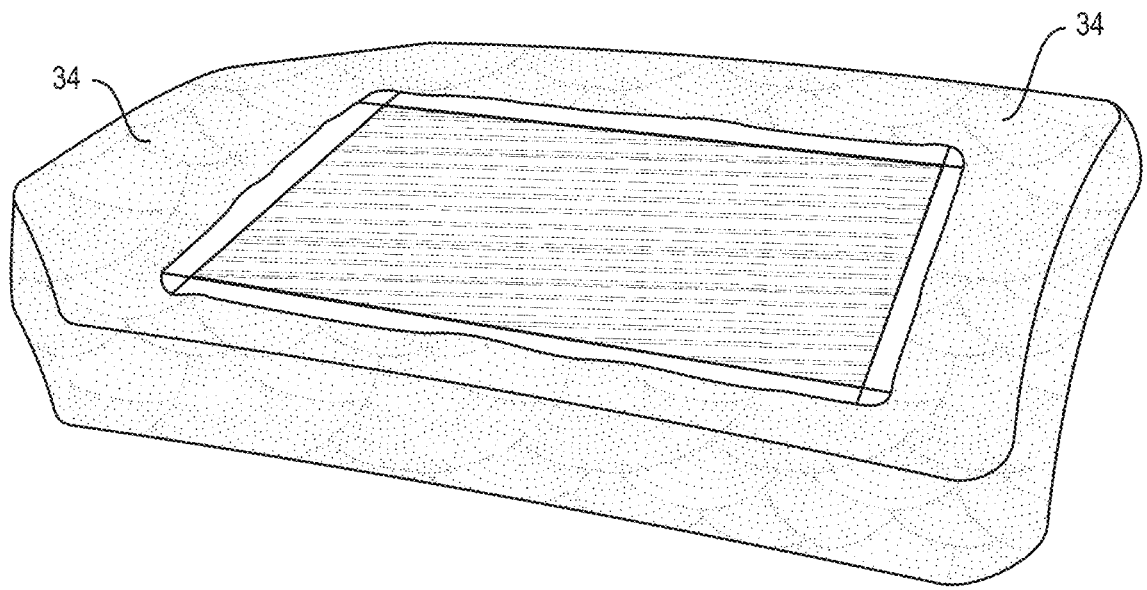
FIGS. 4A and 4B are perspective views of an embodiment of a hard armor plate comprising outer layers.
Figure 4B:
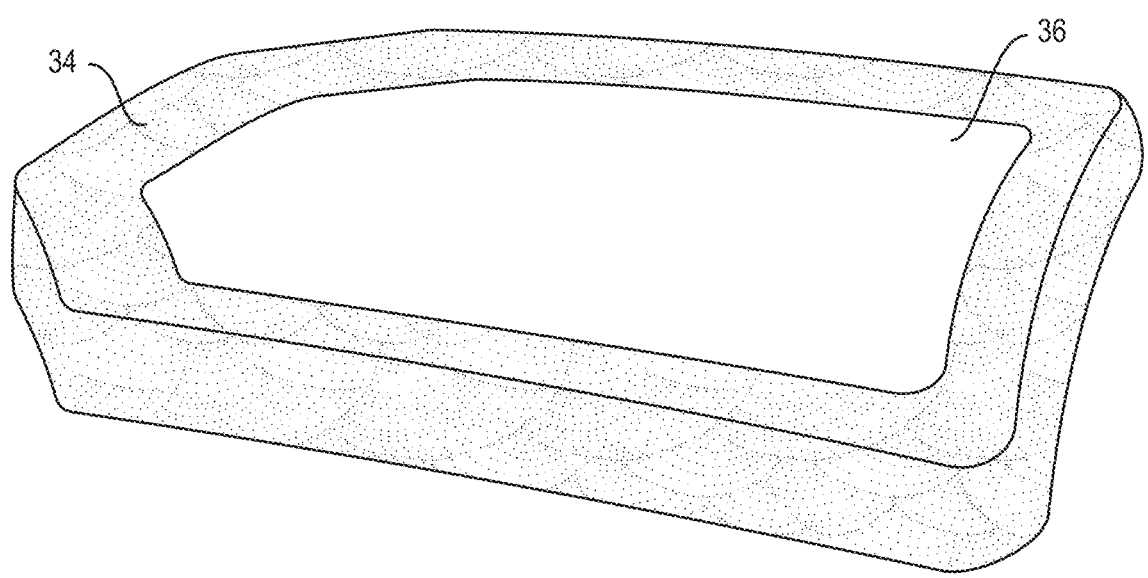

FIGS. 4A, 4B, and 3C are perspective views of an embodiment of a hard armor plate comprising additional adhesives. FIG. 4A illustrates the combined assembly shown in FIG. 1 further comprising an adhesive 20 along the perimeter of the layer of ceramic tiles between the first molded plate of a plurality of ballistic fibers 10 and the second molded plate of a plurality of ballistic fibers 18. The adhesive 20 deters fragmentation of a projectile on impact with the hard armor plate. In one embodiment, the adhesive is a polyurethane, such as 3M Scotch-Seal Polyurethane Sealant 540. FIG. 4B illustrates the combined assembly further comprises an adhesive 30 around the perimeter of the combined assembly of the first molded plate of a plurality of ballistic fibers, the layer of ceramic tiles, and the second molded plate of a plurality of ballistic fibers. In one embodiment, the adhesive is double-sided tape, such as double-sided foam tape. FIG. 3C illustrates the combined assembly further comprises an adhesive 32 on the exterior side of the first molded plate of a plurality of ballistic fibers of the combined assembly and an adhesive (not shown) similarly on the exterior side of the second molded plate of a plurality of ballistic fibers of the combined assembly. In one embodiment, the adhesives are double-sided tape, such as double-sided foam tape.

FIGS. 4A and 4B are perspective views of an embodiment of a hard armor plate comprising additional outer fabric layers. FIG. 4A illustrates the combined assembly shown in FIG. 3C further comprising a stretch polyester clothe skirt 34, and self-adhesive nylon 36 on the exterior side of the first molded plate of a plurality of ballistic fibers of the combined assembly and on the exterior side of the first molded plate of a plurality of ballistic fibers of the combined assembly.

Further described herein is a method of making a method of making a hard armor plate comprising forming a first molded plate of a plurality of ballistic fibers, forming a second molded plate of a plurality of ballistic fibers, adhering a layer of ceramic tiles to the second molded plate, and adhering the first molded plate to the layer of ceramic tiles.

In an exemplary embodiment, the step of forming a first molded plate of a plurality of ballistic fibers comprises a heating and cooling step. In an exemplary embodiment, the heating step comprises heating a plurality of unidirectional aramid layers at a temperature in the range of 150-200 degrees Celsius, applying pressure in the range of 4-10 MPa for 2-5 minutes, applying pressure in the range of 6 and 15 MPa for 10-20 minutes, applying pressure in the range of 15 and 25 MPa for 15-30 minutes, and forming a molded plate. In an exemplary embodiment, the cooling step comprises applying coolant to the molded plate and applying pressure in the range of 15 and 20 MPa until the mold has a temperature in the range of 45-55 degrees Celsius. In another embodiment, the step of forming a first molded plate of a plurality of ballistic fibers further comprises cooling the molded plate for an additional 24 hours or more in ambient room temperatures. In another embodiment, the step of forming a first molded plate of a plurality of ballistic fibers further comprises cutting the molded plate to a shape with a computer numerical control (CNC) saw, bandsaw, or other shape processing methods known in the art.

In another embodiment, the step of forming a second molded plate of a plurality of ballistic fibers comprises a heating and cooling step. In an exemplary embodiment, the heating step comprises heating a plurality of ultra-high molecular weight polyethylene layers at a temperature in the range of 120-150 degrees Celsius, applying pressure in the range of 4-10 MPa for 3-4 minutes, applying pressure in the range of 6-15 MPa for 10-20 minutes, applying pressure in the range of 12 and 25 MPa for 20-40 minutes, and forming a molded plate. In another embodiment, the cooling step comprises introducing a coolant to the molded plate and applying a pressure in the range of 12-25 MPa until the molded plate has a temperature in the range of 50 Celsius. In another embodiment, the step of forming a second molded plate further comprises cooling the molded plate for an additional 24 hours or more in ambient room temperatures. In another embodiment, the step of forming a first molded plate further comprises cutting the molded plate to a shape with a computer numerical control (CNC) saw, bandsaw, or other shape processing methods known in the art.

In another embodiment, adhering a layer of ceramic tiles to the second molded plate with an adhesive comprises using a high performance contact adhesive. In another embodiment, adhering the first molded plate to the layer of ceramic tiles with an adhesive comprises using a high performance contact adhesive. In a further embodiment, weight or pressure is applied to the combined assembly for at least two hours during curing of an adhesive.

In another embodiment, method further comprises, after the layer of ceramic tiles is adhered to the second molded plate and the first molded plate, applying an adhesive along the perimeter of the layer of ceramic tiles between the second molded plate and the first molded plate. In one embodiment, the adhesive is a polyurethane, such as 3M Scotch-Seal Polyurethane Sealant 540, and the method further comprises curing the polyurethane.

In another embodiment, the method further comprises applying an adhesive around the perimeter of the combined assembly of the first molded plate, the layer of ceramic tiles, and the second molded plate. In one embodiment, the adhesive is double-sided tape, such as double-sided foam tape.

In another embodiment, the method further comprises applying an adhesive on the exterior side of the first molded plate of a plurality of ballistic fibers of the combined assembly. In one embodiment, the adhesive is double-sided tape, such as double-sided foam tape. In another embodiment, the method further comprises applying an adhesive on the exterior side of the second molded plate of a plurality of ballistic fibers of the combined assembly. In one embodiment, the adhesive is double-sided tape, such as double-sided foam tape.

In another embodiment, the method further comprises adhering one or more additional layers to the combined assembly. The one or more additional layers include a stretch polyester clothe skirt, and self-adhesive nylon.

Example

Ballistic testing standards ensure minimum capabilities of body armor for resisting ballistic objects. See for example, NIT-STD-0101.07, RF2, which was issued by the National Institute of Justice (NIT) and sets forth threat levels for ballistic resistance of body armor, associated ammunition intended for use, and minimum performance (e.g. no penetration, and backface deformation measurements) and test requirements (e.g. types of ammunition, velocity) for ballistic resistance of body armor.

Ballistic resistance testing was conducted on two hard armor plate samples that were comprised of: a first molded plate of a plurality of uni-directional aramid; a layer of hexagon-shaped, silicone carbide ceramic tiles; and a second molded plate of a plurality of ultra-high molecular weight polyethylene layers; wherein the layer of ceramic tiles is adhered to the first molded plate and the second molded plate. The hard armor plate was about 10×12 inches in size and weight about 5 lbs.

All ballistic resistance testing was conducted by a DOJ/NIJ sanctioned laboratory (H.P. White Laboratory, Inc.) on an indoor range at ambient conditions in accordance with NIJ-STD-0101.07 (DRAFT), RF2 (modified) standards. The ballistic resistance testing had the following set-up:
  shot spacing according to NIJ-S TD-0101.07, RF2
  obliquity at 0 degrees
  ambient conditions
  temperature at 68° F.
  a 5.5" clay/plywood backing material
  primary velocity screens at 39.5 feet and 44.5 feet
  primary velocity location 42.0 feet from muzzle
  range to target at 50.3 feet
  target to W/t at 0.0 inches
  BP: 30.05 in Hg
  RH: 58%
  barrel No./gun: 223/R1
  Sample C85: 5.56×45 mm, M193, 55 gr ammunition
  Sample C86: 5.56 mm ball, M855, 62 gr ammunition
  Pre test clay drops were 19 mm, 19 mm, 19 mm, 18 mm, 18 mm
  Re test clay temperature was 102.1° F.

Testing was conducted using caliber 5.56 mm, 62 gr., M855 Ball and 5.56×45 mm, 55 gr., M193 ammunition. The test samples were positioned 50.3 feet from the muzzle of the barrel to produce zero (0°) degree obliquity impacts. Photoelectric infrared screens were located at 39.5 feet and 44.5 feet which, in conjunction with electronic chronographs, were used to compute bullet velocities at 42.0 feet forward of the muzzle. Penetrations were determined by visual example of the 5.5-inch-thick clay backing material. Backface signature was measured using a calibrated digital depth gauge.

| Ballistic resistance testing results: | | | | | | | |
| --- | --- | --- | --- | --- | --- | --- | --- |
| Shot No. | Ammo. | Time 1 (usec) | Velocity 1 (ft/s) | Time 2 (usec) | Velocity 2 (ft/s) | Avg. Vel. (ft/s) | Penetration | Deformation |
| Sample C85 | | | | | | | | |
| 1 | 1 | 1524 | 3281 | 1529 | 3270 | 3275 | None | 36 mm |
| 2 | 1 | 1533 | 3262 | 1538 | 3251 | 3256 | None | 35 mm |
| 3 | 1 | 1549 | 3228 | 1551 | 3224 | 3226 | None | 34 mm |
| Sample C86 | | | | | | | | |
| 1 | 1 | 1609 | 3108 | 1612 | 3102 | 3105 | None | 31 mm |
| 2 | 1 | 1616 | 3094 | 1619 | 3088 | 3091 | None | 33 mm |
| 3 | 1 | 1620 | 3086 | 1622 | 3083 | 3085 | None | 33 mm |

The ballistic resistance testing shows the hard armor plates stopped new military grade 5.56 M855A1 and M193 at velocities over 3000 ft/s without shrapnel.

Numerous modifications and variations of the present disclosure are possible in view of the above teachings. It is understood that within the scope of the appended claims, the disclosure may be practiced otherwise than as specifically described herein.

It should be understood that the above description is only representative of illustrative embodiments and examples. For the convenience of the reader, the above description has focused on a limited number of representative examples of all possible embodiments, examples that teach the principles of the disclosure. The description has not attempted to exhaustively enumerate all possible variations or even combinations of those variations described. That alternate embodiments may not have been presented for a specific portion of the disclosure, or that further undescribed alternate embodiments may be available for a portion, is not to be considered a disclaimer of those alternate embodiments. One of ordinary skill will appreciate that many of those undescribed embodiments, involve differences in technology and materials rather than differences in the application of the principles of the disclosure. Accordingly, the disclosure is not intended to be limited to less than the scope set forth in the following claims and equivalents.

The invention claimed is:

1. A hard armor plate comprising:
  a first molded plate of a plurality of ballistic fibers, formed from a plurality of unidirectional aramid layers;
  a second molded plate of a plurality of ballistic fibers, formed from a plurality of ultra-high molecular weight polyethylene layers; and
  a layer of ceramic tiles adhered to the first molded plate and the second molded plate,
  wherein the layer of ceramic tiles is adhered to the first molded plate by a first layer of adhesive positioned between the layer of ceramic tiles and the first molded plate, wherein the first layer of adhesive covers a top surface of the ceramic tiles, wherein the layer of ceramic tiles is adhered to the second molded plate by a second layer of adhesive positioned between the layer of ceramic tiles and the second molded plate, wherein the second layer of adhesive covers a bottom surface of the ceramic tiles, wherein the layer of ceramic tiles is between the first molded plate and the second molded plate, wherein the layer of ceramic tiles is narrower in width and height than the first molded plate and the second molded plate and the hard armor plate, wherein the first layer of adhesive and the second layer of adhesive cooperatively extend outwardly of a perimeter of the layer of ceramic tiles to seal a perimeter thereof, the adhesive extending into the area defined where the layer of ceramic tiles is narrower in width and height than the first molded plate and the second molded plate.

2. The hard armor plate of claim 1, wherein the plurality of ballistic fibers of the first molded plate are a plurality of layers of unidirectional aramid with lamination 20 gsm per square meter.

3. The hard armor plate of claim 1, wherein the plurality of ballistic fibers of the first molded plate are 20-40 layers of unidirectional aramid.

4. The hard armor plate of claim 1, wherein the plurality of ballistic fibers of the second molded plate are a plurality of layers of ultra-high molecular weight polyethylene with lamination 100 gsm per square meter.

5. The hard armor plate of claim 1, wherein the plurality of ballistic fibers of the second molded plate are a molded plate of 80-130 layers of ultra-high molecular weight polyethylene.

6. The hard armor plate of claim 1, wherein the ceramic tiles are hexagon-shaped, silicone carbide ceramic tiles.

7. The hard armor plate of claim 1, wherein the ceramic tiles are 5.8 mm thick and 30 cm×30 cm.

8. The hard armor plate of claim 1, wherein the ceramic tiles are pressure sintered ceramic tiles.

* * * * *